US005209603A

United States Patent [19]

Morgan

[11] Patent Number: 5,209,603

[45] Date of Patent: May 11, 1993

[54] SECONDARY CONTAINMENT STRUCTURE AND METHOD OF MANUFACTURE

[76] Inventor: J. P. Pat Morgan, P.O. Box 1089, St. George, Utah 84771

[21] Appl. No.: 757,813

[22] Filed: Sep. 11, 1991

[51] Int. Cl.⁵ .................... B65G 5/00

[52] U.S. Cl. .................... 405/52; 52/659; 264/256; 405/55

[58] Field of Search .................... 405/52, 128; 264/256, 264/109; 52/659

[56] References Cited

U.S. PATENT DOCUMENTS

| | | | |
|---|---|---|---|
| 14,273 | 2/1856 | Bartlett | 405/55 X |
| 3,378,617 | 4/1968 | Elmendorf | 264/256 X |
| 3,469,000 | 9/1969 | Smith | 264/256 X |
| 4,133,928 | 1/1979 | Riley et al. | 52/659 X |
| 4,372,906 | 2/1983 | del Valle | 264/256 |
| 4,450,128 | 5/1984 | Takeuchi | 264/256 X |
| 4,565,840 | 1/1986 | Kobayashi et al. | 52/659 X |
| 4,708,745 | 11/1987 | Schonhausen | 264/246 X |
| 4,784,821 | 11/1988 | Leopold | 264/256 X |
| 4,834,929 | 5/1989 | Dehoff et al. | 264/256 X |
| 5,030,033 | 7/1991 | Heintzelman et al. | 405/52 X |
| 5,059,063 | 10/1991 | Sugimoto et al. | 405/132 X |

*Primary Examiner*—Dennis L. Taylor
*Attorney, Agent, or Firm*—Kenneth A. Roddy

[57] ABSTRACT

A secondary containment structure formed of a slurry infiltrated fiber concrete composite is used above ground or underground to enclose material storage containers and to safely contain any materials leaked from the container. The structure is a hollow configuration having a bottom wall, at least one side wall, and a removable top wall. The interior volume of the structure exceeds the volume capacity of the container which is enclosed therein. The bottom wall is sloped to facilitate drainage of any liquid leaked from the container and the top wall may have covered apertures to allow access to the container. The structure is formed of a slurry infiltrated fiber concrete composite which is produced by first placing a plurality of individual short fibers or fiber mats of organic or inorganic materials into a form to create a bed of fibers substantially filling the form and having a predetermined fiber volume density and then adding the slurry mixture into the form to completely infiltrate the spaces between the fibers. The slurry mixture includes a composition of Portland cement, fly ash, water, a high range water reducer (superplasticizer), and may also include fine grain sand, chemical admixtures, and other additives. Due to its fiber volume density and method of manufacture, the resulting secondary containment structure has thinner walls, greater strength, and a gross weight significantly less than conventional reinforced and pre-stressed concrete structures of the same size.

26 Claims, 4 Drawing Sheets

SECONDARY CONTAINMENT STRUCTURE AND METHOD OF MANUFACTURE

BACKGROUND OF THE INVENTION

1. Field of the Invention

This invention relates generally to structures for storage of hazardous materials, and more particularly to a monolithic secondary containment vault system for isolating material storage tanks which is formed of slurry infiltrated fiber concrete.

2. Brief Description of the Prior Art

In the past, materials such as petroleum products, chemicals, and hazardous materials have been stored in large metal or fiberglass tanks which are buried underground. Most of these underground storage tanks are prone to leakage due to being subjected to the hydrostatic forces of ground water, physical stresses associated with ground movement, and the corrosive action of soil environments. These steel tanks are known to begin failing leakage tests or to begin leaking at a much greater frequency after about twelve years in operation. Great damage to the environment and personal injury often results when the leaked materials enter the soil or ground water.

The United States Environmental Protection Agency (EPA) has recently adopted new regulations for Underground Fuel Storage Tanks (UFST) in response to the growing awareness of the damage caused by releases from the UFST's. These regulations will require UFST owners to spend significant sums of money over the life of the storage tanks for monitoring, reporting, and corrective actions. Failure to comply with the EPA regulations could result in having to take the storage tank out of service, and the possibility of financial liability for property damage and personal injuries. The EPA has estimated that more than $69 billion will be spent over the next 30 years on UFST systems in leak detection, inspections, upgrading, and corrective actions.

One method to comply with the EPA regulations is to place the fuel storage tank inside a buried "secondary containment vault". The secondary containment vault is a box-like structure having an interior volume greater than the capacity of the tank it contains. Such a system provides the ability to easily monitor the tank for leakage. Should a leak occur, the secondary containment vault will completely contain the leak, preventing the fuel from entering the soil or ground water. The secondary containment vault also isolates the fuel tank from soil and hydrostatic pressures and the corrosive action of many soils. Fuel tanks which are situated in secondary containment vaults in a manner to allow physical inspection are specifically excluded from EPA and most state regulations.

Most underground secondary containment vaults currently available are fabricated using conventional reinforced and pre-stressed concrete. To meet the structural design requirements for resisting hydrostatic and soil pressures, the walls of the vaults are generally from 8 to 10 inches thick. This produces a structure which is too heavy to be transported or shipped as a single unit. As a result, most conventional secondary containment vaults are manufactured in three parts; a monolithic lower section, an upper section, and a roof slab for the upper section. The roof slab is manufactured in several panels. To develop the required structural capacity of the vault wall, and to insure a leak-free joint between the lower and upper sections, post tensioned cables are used to draw the two sections together after the components have been assembled in the excavation. Rubber gaskets and caulking are employed to make the joint leak free. Such a secondary containment vault is manufactured by SCV Corp. of San Antonio, Tex.

Another conventional precast concrete secondary containment vault is manufactured by Utility Vault Company, Inc., of Pleasanton, Calif.

The disadvantages of the conventional three-part concrete secondary containment vault are overcome by the present secondary containment system which is a monolithic vault system formed of slurry infiltrated fiber concrete having thinner walls and a gross weight significantly less than conventional reinforced and prestressed concrete vaults of the same size. As pointed out hereinafter, the concrete composite material is quite different from "steel fiber reinforced concrete" in both its fiber volume density and in the way it is manufactured.

There are several patents which disclose various fiber reinforced concrete structures.

U.S. Pat. No. 3,429,094 to Romualdi discloses a two-phase concrete and steel material comprising closely spaced short wire segments uniformly distributed randomly in concrete wherein the average spacing between wire segments is not greater than 0.5 inches.

Fleischer et al, U.S. Pat. No. 4,257,912 discloses a system for fixed storage of spent nuclear fuel having activated fission products contained within a metallic fuel rod housing which comprises a uniform concrete contiguously and completely surrounding the metallic housing which has metallic fibers to enhance thermal conductivity and polymers to enhance impermeability for convectively cooling the exterior surface of the concrete.

Lankard et al, U.S. Pat. No. 4,559,881 discloses a burglar resistant security vault formed of prefabricated steel fiber reinforced concrete modular panels.

Double et al, U.S. Pat. No. 4,780,141 discloses a cementious composite material containing metal fiber which particularly formulated to have high strength and a high degree of vacuum integrity at high temperatures. The composite comprises a high strength cement matrix and a filler component comprising a metal fiber having a length of about 0.05 mm. to about 5 mm. (about 0.02" to about 0.20"). The metal fiber filler is mixed with the cement matrix at a high vacuum to minimize air bubbles and then the liquid mixture (including metal fiber) is poured into the mold.

The present invention is distinguished over the prior art in general, and these patents in particular by a secondary containment structure formed of a slurry infiltrated fiber concrete composite which is used above ground or underground to enclose material storage containers and to safely contain any materials leaked from the container. The structure is a hollow configuration having a bottom wall, at least one side wall, and a removable top wall. The interior volume of the structure exceeds the volume capacity of the container which is enclosed therein. The bottom wall is sloped to facilitate drainage of any liquid leaked from the container and the top wall may have covered apertures to allow access to the container. The structure is formed of a slurry infiltrated fiber concrete composite which is produced by first placing a plurality of individual short fibers or fiber mats of organic or inorganic materials into a form to create a bed of fibers substantially filling the form and having a predetermined fiber volume density and then adding the slurry mixture into the form to completely infiltrate the spaces between the fibers. The slurry mixture includes a composition of Portland cement, fly ash, water, a high range water reducer (superplasticizer), and may also include fine grain sand, chemical admixtures, and other additives. Due to its fiber volume density and method of manufacture, the resulting secondary containment structure has thinner walls, greater strength, and a gross weight significantly less than conventional reinforced and pre-stressed concrete structures of the same size.

SUMMARY OF THE INVENTION

It is therefore an object of the present invention to provide a monolithic secondary containment vault system for isolating material storage tanks which is formed of slurry infiltrated fiber concrete having thinner walls, greater strength, and a gross weight significantly less than conventional reinforced and pre-stressed concrete vaults of the same size.

It is another object of this invention is to provide a monolithic secondary containment vault system for isolating material storage tanks which may be transported and shipped as a single unit.

Another object of this invention is to provide a method of manufacturing secondary containment structures of slurry infiltrated fiber concrete which have thinner walls, greater strength, and a gross weight significantly less than conventional reinforced and pre-stressed concrete structures of the same size.

Another object of the present invention to provide a monolithic secondary containment vault system for protecting storage tanks containing materials such as petroleum products, chemicals, and hazardous materials.

Another object of this invention to provide a monolithic secondary containment vault system for use underground to isolate storage tanks containing harmful materials from the hydrostatic forces of ground water, physical stresses associated with ground movement, and the corrosive action of soil environments.

A further object of this invention is to provide a monolithic secondary containment vault system for isolating material storage tanks which, in the event of tank leakage, will completely contain the leak and prevent the leaked materials from entering the soil or ground water.

A still further object of this invention is to provide a monolithic secondary containment vault system for isolating material storage tanks which will effectively prevent intrusion of ground water into the vault.

Other objects of the invention will become apparent from time to time throughout the specification and claims as hereinafter related.

The above noted objects and other objects of the invention are accomplished by a secondary containment structure formed of a slurry infiltrated fiber concrete composite which is used above ground or underground to enclose material storage containers and to safely contain any materials leaked from the container. The structure is a hollow configuration having a bottom wall, at least one side wall, and a removable top wall. The interior volume of the structure exceeds the volume capacity of the container which is enclosed therein. The bottom wall is sloped to facilitate drainage of any liquid leaked from the container and the top wall may have covered apertures to allow access to the container. The structure is formed of a slurry infiltrated fiber concrete composite which is produced by first placing a plurality of individual short fibers or fiber mats of organic or inorganic materials into a form to create a bed of fibers substantially filling the form and having a predetermined fiber volume density and then adding the slurry mixture into the form to completely infiltrate the spaces between the fibers. The slurry mixture includes a composition of Portland cement, fly ash, water, a high range water reducer (superplasticizer), and may also include fine grain sand, chemical admixtures, and other additives. Due to its fiber volume density and method of manufacture, the resulting secondary containment structure has thinner walls, greater strength, and a gross weight significantly less than conventional reinforced and pre-stressed concrete structures of the same size.

DESCRIPTION OF THE PREFERRED EMBODIMENT

Figure 1:
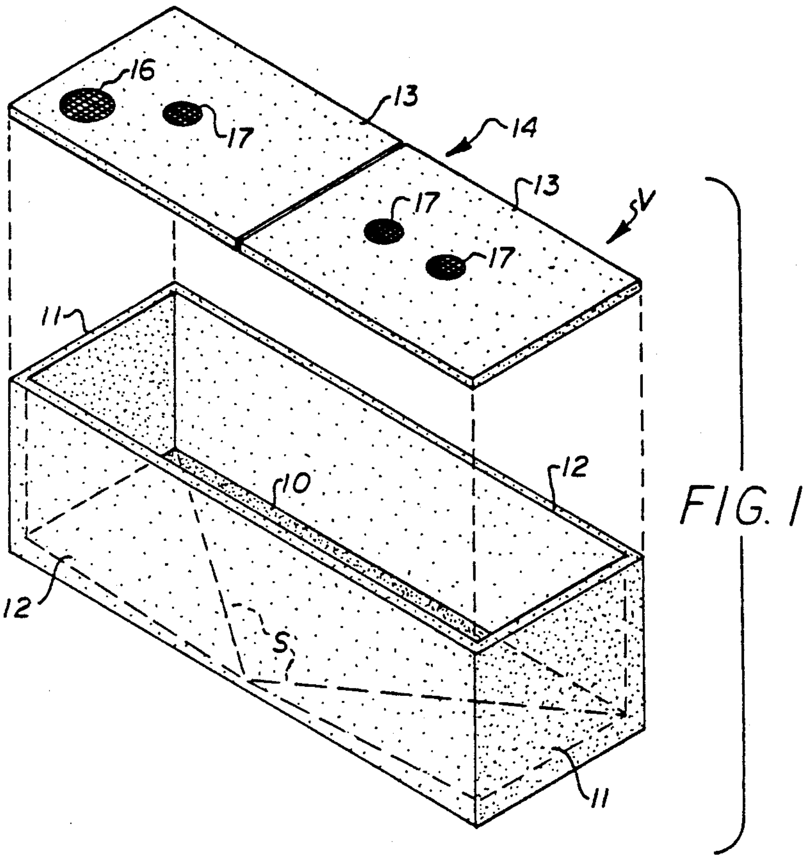
FIG. 1 is an exploded isometric view of a secondary containment vault in accordance with the present invention.
Figure 2:
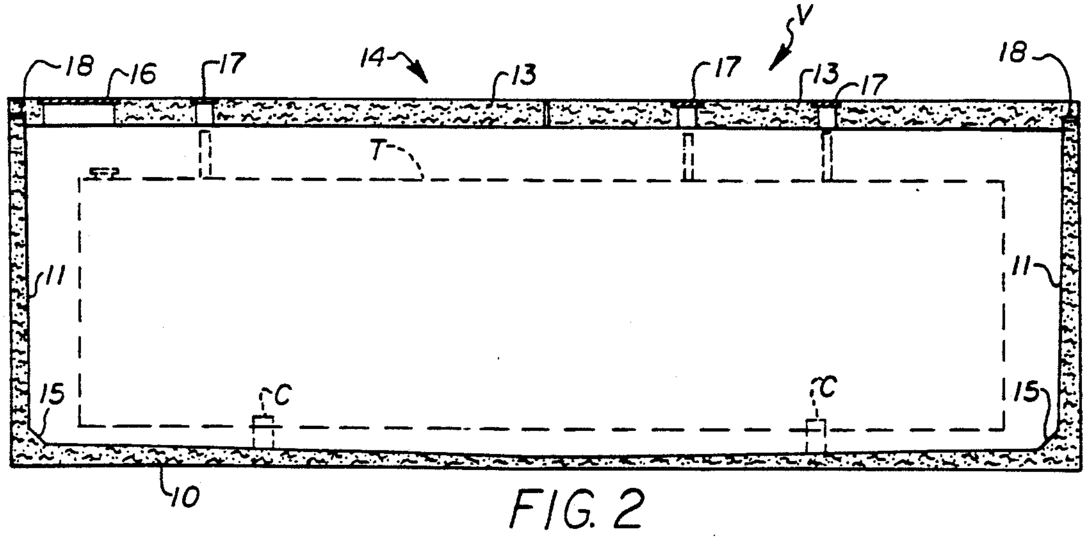
FIG. 2 is longitudinal cross section of the secondary containment vault of FIG. 1.
Figure 3:
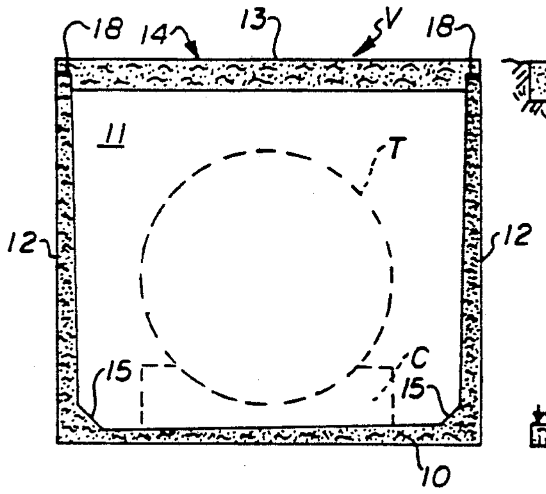
FIG. 3 is a transverse cross section of the secondary containment vault of FIG. 1.

Referring to the drawings by numerals of reference, there is shown in FIGS. 1, 2, and 3, a preferred secondary containment vault V. The vault V is a box-like structure which may be buried underground or may be used above ground. The preferred vault is a monolithic structure having a bottom wall 10, opposed end walls and opposed side walls 12. A plurality of separate panels 13 form the roof slab 14. A vault in accordance with the present invention used for protecting fuel tanks may typically be approximately 10 feet tall, 12 feet wide, and 32 feet in length. However, it should be understood that the vault may be made in various sizes depending upon the particular application and a single roof slab may be used.

In the example illustrated, a fuel storage tank T is placed inside the vault V and supported above the floor 10 on cradles C. The vault has an interior volume greater than the capacity of the tank it contains such that in the event a leak should occur, the secondary containment vault V will completely contain the leaked materials.

The inside corners 15 at the juncture of the bottom wall 10 and the walls 11 and 12 of the vault V may be angled approximately 45° for a distance of about 6" above the bottom wall. As represented in dotted line S in FIG. 1, the top surface of the bottom wall 10 slopes from each end wall 11 and one side wall 12 inwardly and toward the opposed side wall to facilitate drainage of any leaked material.

The panels 13 forming the roof 14 are placed on top of the open end of the vault V and may be provided with various apertures, such as manhole access ports 16 which allow access to the interior by workers to conduct testing or other operations inside the vault. The panels 13 may also be provided with additional apertures 17 to access various fittings on the primary tank, such as monitoring equipment, vapor recovery tubes, drop tubes, gauging tubes, and pump manifolds, etc. The apertures are provided with cover plates. Suitable seals or gaskets 18 are installed between the top surface of the walls 11,12 and the bottom surface of the panels 13.

Figure 4:
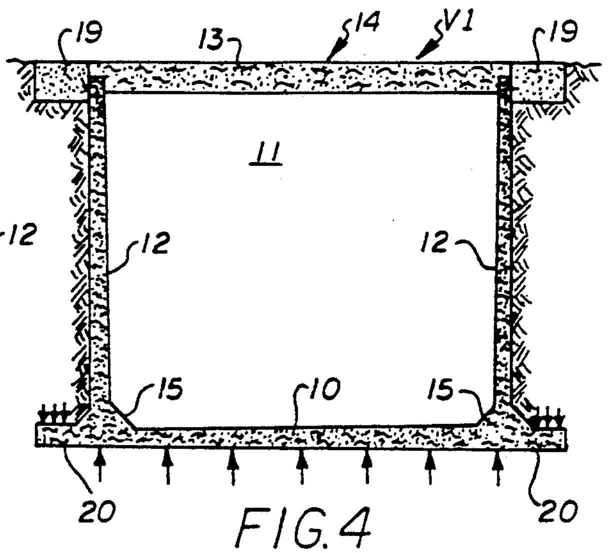
FIG. 4 is a transverse cross section of an alternate embodiment of the secondary containment vault.

Because the vault V is made of slurry infiltrated fiber concrete, its total weight is substantially less than conventional reinforced or pre-stressed concrete structures of the same size, and it may be desirable in some underground installations to modify the structure to prevent up-lift due to buoyant conditions. Such an embodiment V1 is shown in FIG. 4.

The vault V1 is provided with a concrete beam 19 surrounding the top edge of the walls 11,12 of sufficient weight to prevent the vault from floating in a high ground water condition. A similar beam may also be provided at the base of the structure. The vault V1 may also be modified by extending the bottom wall 10 outwardly from the walls 11,12 to provide a peripheral base extension 20. When the vault V is buried, the weight of the earth on the base extension 20 will aid in reducing the buoyancy effect. The base extension 20 will also reduce the bending forces in the bottom wall 10 and walls 11,12, to some extent.

MATERIALS OF CONSTRUCTION

In one embodiment, the vault is made of a slurry infiltrated fiber concrete composite material known as "SIFCON", a relatively new concrete composite being developed by the New Mexico Engineering Research Institute of the University of New Mexico in Albuquerque, N. Mex. (NEMERI). SIFCON utilizes short steel fibers in a Portland cement based matrix. It should be noted that "SIFCON" differs significantly from conventional "steel fiber reinforced concrete" (SFRC), as explained below.

In the conventional steel fiber reinforced concrete process, the steel fibers are added directly to a typical concrete mix in the ratio of 0.5% to 1.5% by volume. On the other hand, the "SIFCON" process starts with a bed of pre-placed steel fibers in the range of 5% to 20% by volume and then infiltrates the fiber bed with a low viscosity, cementious slurry composition.

The steel fibers used in "SIFCON" are manufactured from drawn wire or cut from thin steel sheets. The steel fibers may be provided in several different lengths and diameters, and most have some type of deformation to aid in mechanical bonding. A preferred steel fiber is approximately 2.36" long and 0.03" in diameter with a deformed end. The slurry ingredients are usually Portland cement, fly ash, and water, and a fine sand is often included. In addition, a high range water reducer (superplasticizer) is used to increase the slurry's flow. Other ingredients, such as microsilica (silica fume), latex modifiers, polymers, and other common concrete additives may be used in "SIFCON" slurry mixes.

The bed of fibers may also be formed of one or more blankets or mats of generally continuous strands of fibrous material having a fiber volume density in the range of from about 5% to about 20%. A preferred fiber mat would have a fiber volume density of from about 8% to 12% with each strand of the fibrous material approximately 0.03" in diameter.

Figure 5:
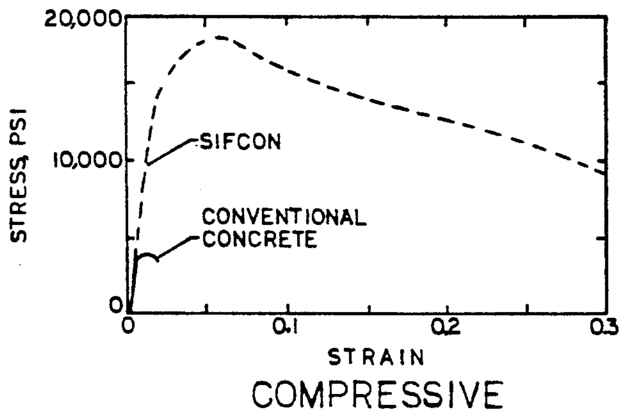
FIG. 5 is a chart showing the compressive strength of SIFCON material compared to conventional concrete.
Figure 6:
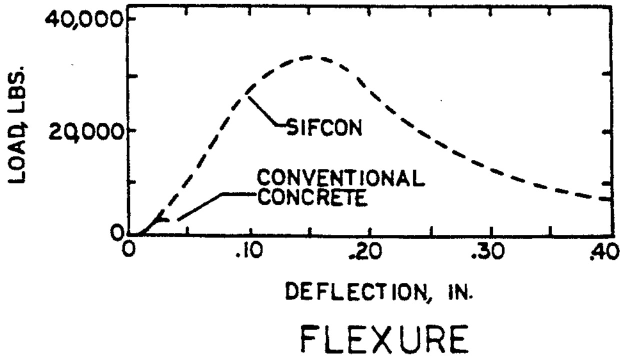
FIG. 6 is a chart showing the flexure of SIFCON material compared to conventional concrete.
Figure 7:
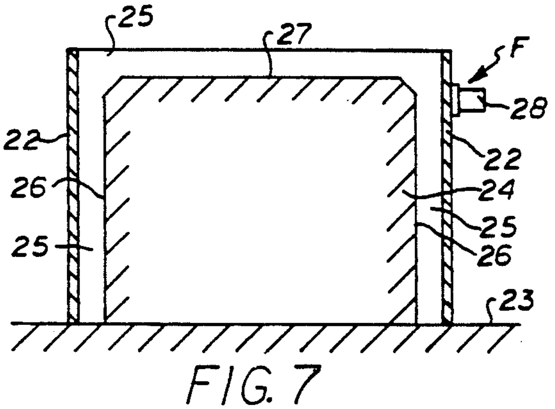
FIGS. 7, 8, 9, 10, 11 and 12, are cross sections illustrating schematically various stages in the method of manufacturing the secondary containment vault.

The resulting "SIFCON" and "fiber mat" composite structure has a much higher compressive strength, toughness, and ductibility than conventional concrete. A general comparison of the differences in compressive strength is illustrated graphically in FIG. 5, and the differences in the flexural properties is shown in FIG. 6. Compressive strengths in the range of 15,000 to 30,000 psi are common for "SIFCON" and its shear and flexural capacity is generally 10 to 20 times higher than conventional concrete.

The present vault may also be made of a slurry infiltrated fiber concrete composite material which utilizes short fibers or fibrous mats of other material such as plastics or aramids, combinations thereof, and combinations of steel, plastic, or aramid fibers. It can also be made of a slurry infiltrated fiber concrete composite material which utilizes short fibers or fibrous mats of inorganic material such as carbon or boron, combinations thereof, and combinations of the steel, carbon, or boron fibers. The vault may also be made of a slurry infiltrated fiber concrete composite material which utilizes short fibers or fibrous mats of a combination of the organic materials and inorganic materials. In some applications, an epoxy-coated steel fiber may be used.

As with the steel fibers, the organic and/or inorganic fibers or fiber mats are placed to form a bed of fibers in the range of 5% to 20% by volume and then infiltrated with a low viscosity, cement slurry composite. The slurry may also include: refractory castables, castable plastics and epoxies, or clay based slurries.

METHOD OF MANUFACTURE

Referring now to FIGS. 7 through 12, there is shown a typical wood or steel mold or form F having four side walls 22 joined together to form a hollow rectangular or square box construction open at the top and bottom ends which is supported on a flat surface 23. The side walls 22 are spaced outwardly from a central box-like core member 24 and extend above the core to form a cavity 25 surrounding the sides and top end of the core. Since the slurry has a relatively low viscosity, all joints and holes should be sealed with caulking or other sealing material to insure that the form is watertight.

It should be understood that the core member 24 may be shaped in any suitable configuration to form the interior of the product to be molded. However, for purposes of illustration and discussion, the core member 24 is shown to be a square box-like construction having four opposed side walls 26 and a top end wall 27, and the product to be formed by the present method will be described as a simple box configuration, such as those used forming the vault depicted in FIG. 1.

Small pneumatic vibrators 28 of the type used on bulk cement hoppers, spaced about 6 ft. on centers on one side of the form may optionally be used when forming walls up to 8 inches thick. For thicker walls, small vibrators on both sides of the wall or larger external form vibrators could be used.

Figure 8:
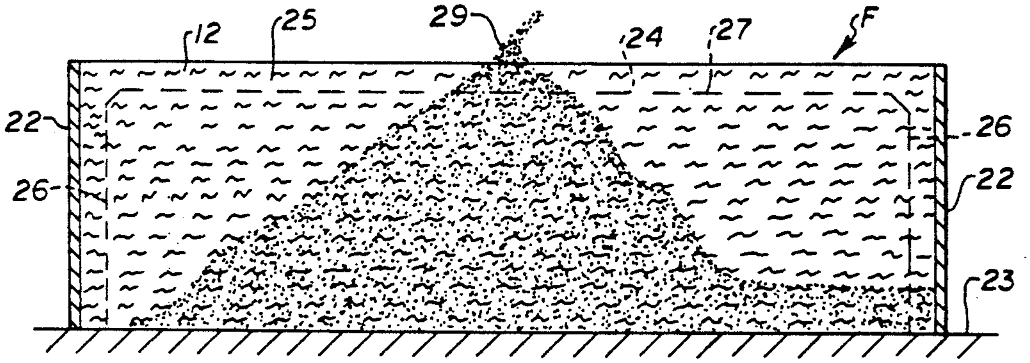

The short fibers of steel, or other organic or inorganic material are sprinkled either by hand or mechanical means into the cavity 25 surrounding the core 24. The form F is completely filled to the top with fibers (FIG. 8). A major consideration for placing the fibers in the form is that they must be allowed to fall freely as individual fibers into the form. This allows the fibers to interlock forming a continuous uniform mass.

Figure 11:
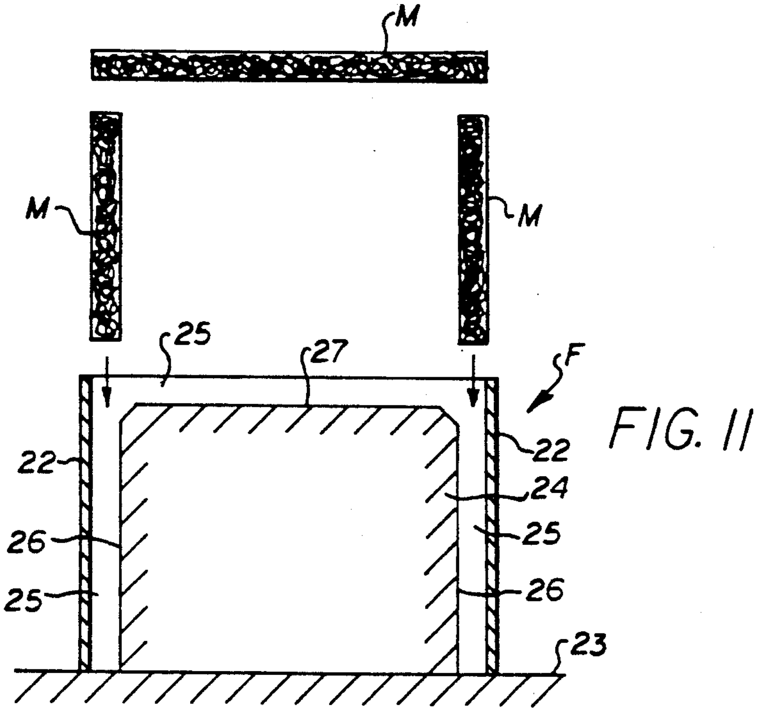

Alternatively, as seen in FIG. 11, one or more blankets or mats M of generally continuous strands of fibrous steel or other organic or inorganic material are placed either by hand or mechanical means into the cavity 25 surrounding the core 24 to completely fill the form F. The fiber mats are placed in the form to form a continuous uniform mass or fiber bed.

Depending upon the geometric properties of the particular fiber being used, and to a lesser degree on the geometry of the form, a specific fiber volume density will be achieved. The preferred fiber volume density is in the range of 8% to 12%.

After the fibers or fiber mats have been placed, the low viscosity slurry 29 is mixed and infiltrated into the fiber bed, filling the spaces between the fibers (FIG. 8). The slurry ingredients should be thoroughly mixed to insure that there are no lumps of cement or fly ash which would block the opening in the fiber bed and restrict the infiltration of the slurry.

Figure 12:
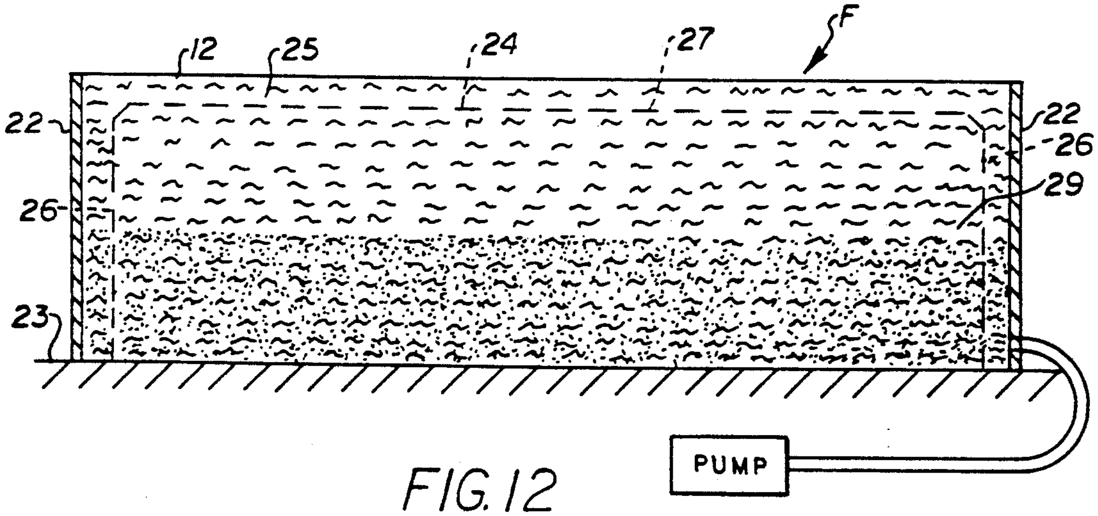

FIG. 8 shows the slurry being added to the fiber bed by pouring or pumping it into the cavity from the top. However, as shown in FIG. 12, another preferred method is to pump the slurry mixture under pressure into the lower portion of the cavity to completely infiltrate the spaces between the fibers from the bottom of the bed of fibers to the top thereof and fill the cavity surrounding the core member and above the core member. This method reduces the likelihood of forming voids in the material and facilitates complete infiltration of the fiber bed.

The slurry mixture proportions can vary, depending upon the desired strength or other physical properties of the finished structure. In addition, form geometry, fiber type, and the particular method of placing the slurry can also determine certain mixture parameters. Preferred cement-fly ash-sand proportions range from 90-10-0 to 30-20-50, respectively, by weight. The preferred ratio of water to cement plus fly ash is from 0.45 to 0.20 and the amount of superplasticizer is from 0 to 40 ounces per 100 pounds of cement plus fly ash. Due to variations in types of cement, fly ash, and sand in various locales, and the various brands of superplasticizers available, it is advisable to determine the slurry mix proportions by trial batch methods using the available materials.

The slurry should remain in a fluid state for a relatively long time sufficient to allow the slurry to flow through and fully infiltrate the fiber bed. If a form vibrator is used, the form is vibrated sufficiently to insure complete infiltration, eliminate voids, and compact the concrete slurry.

Figure 9:
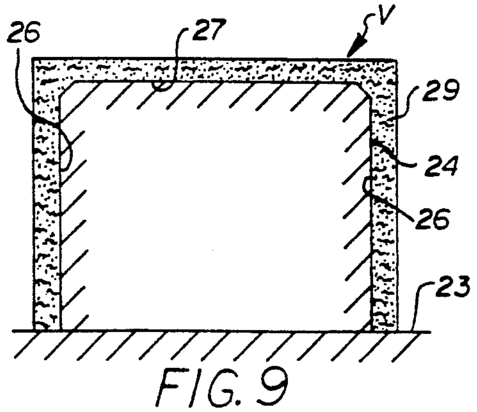
Figure 10:
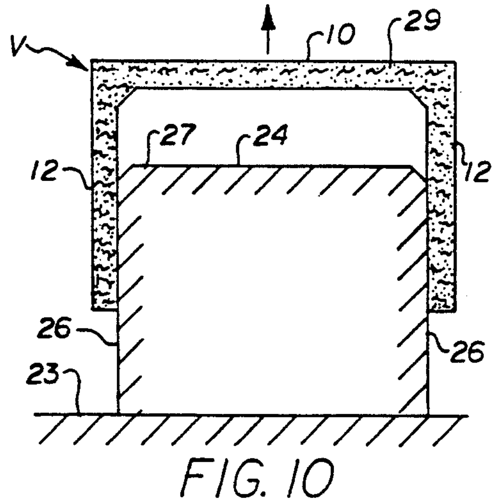

After the concrete has sufficiently cured, the form walls 22 surrounding the core 24 are carefully removed so as not to damage the shape formed thereby (FIG. 9). The curing procedures are the same as for conventional concrete. Depending upon the application, water spray or fogging, wet burlap, waterproof paper, plastic sheeting, or liquid membrane compounds can be used.

After the structure has cured, it is lifted off the core 24 (FIG, 10). A coating of a penetrating concrete sealer is then applied to all surfaces of the structure. This will also minimize the staining and rusting of the fibers exposed on the surface of embodiments using steel fibers.

Preliminary design studies on the present slurry infiltrated fiber concrete vault system have been conducted by the New Mexico Engineering Research Institute of the University of New Mexico in Albuquerque, N. Mex. (NMERI). The vault was analyzed as a rigid frame using a soil load equivalent to a fluid density of 95 pcf. Because the vault was to be cast as a monolithic unit, special consideration was given to the direction of load application as compared to the orientation of the structural element. The fiber used in this design study was a "Dramix ZL 60/80" fiber, made by Bekaert Wire Company, which was found to produce a SIFCON with the highest ratio of flexural capacities in the two orthogonal directions. The following SIFCON properties were used in the design:

For vertical elements (load perpendicular to gravity axis):
- Unconfined axial compression: 10,000 psi
- Modulus of rupture: 1,800 psi
- Shear: 3,000 psi For horizontal elements (load parallel to gravity axis):
- Unconfined axial compression: 15,000 psi
- Modulus of rupture: 5,800 psi
- Shear: 4,500 psi Using the results of the analysis and the appropriate material properties, a thickness of 4.5" was calculated for the bottom of the wall at the corner fillet. For economy, and as an aid in fabricating the vault, the wall was tapered to a thickness of 4" at the top of the wall. The thickness for the base was calculated to be slightly larger than 4". To allow for any spilled fuel to flow to a low point in the floor, the surface was sloped upward to the sides for a thickness of 4.5" at the corner fillet.

On the other hand, a vault fabricated using conventional pre-stressed concrete would require a wall thickness of 8" to 10" to meet the structural design requirements for resisting these soil loading conditions.

Thus, the monolithic secondary containment vault system of the present invention formed of slurry infiltrated fiber concrete allows the vault to have thinner walls and a gross weight significantly less than conventional reinforced and pre-stressed concrete vaults of the same size, and has greater compressive strength, toughness, and ductibility.

While this invention has been described fully and completely with special emphasis upon several preferred embodiments, it should be understood that within the scope of the appended claims the invention may be practiced otherwise than as specifically described herein.

I claim:

1. An improved secondary containment structure of the type used in isolating material storage containers and containing materials leaked therefrom, the improved structure comprising;

a fiber concrete composite bottom wall, at least one fiber concrete composite side wall, and a removable top wall defining an interior volume configured to receive and enclose a container of hazardous material and the interior volume exceeding the volume capacity of the hazardous material container, and said fiber concrete composite bottom wall and said fiber concrete composite side wall each containing a uniform continuous mass of individual interlocked fibers completely infiltrated by and embedded in a cementious matrix mixture of Portland cement, fly ash, water, and a water-reducing superplasticizer and having a fiber volume density in the range of from about 5% to about 20%.

2. The improved secondary containment structure according to claim 1, including a surface coating of penetrating concrete sealer material on said fiber concrete composite bottom wall, said at least one fiber concrete composite side wall, and said removable top wall.

3. The improved secondary containment structure according to claim 1, in which said secondary containment structure is a box-like structure having a fiber concrete composite bottom wall, opposed fiber concrete composite end walls, and opposed fiber concrete composite side walls, each containing the recited materials.

4. The improved secondary containment structure according to claim 1, in which said secondary containment structure is a monolithic structure having a contiguous bottom wall and at least one side wall integrally formed therewith, and a removable top wall.

5. The improved secondary containment structure according to claim 1, including a fiber concrete composite beam surrounding said at least one side wall and being of sufficient weight to prevent up-lift of said structure due to the effect of buoyancy forces when said structure is installed underground in soil and subjected to a relatively high ground water condition.

6. The improved secondary containment structure according to claim 1, in which said fiber concrete composite bottom wall extends outwardly a distance from said at least one side wall to provide a base extension of sufficient size such that when said structure is installed underground said side wall and said base extension will be buried in the soil to prevent up-lift of said structure due to the effect of buoyancy forces when said structure is subjected to a relatively high ground water condition.

7. The improved secondary containment structure according to claim 1, in which said mass of fibers are selected from the group of materials consisting of steel, plastic, and aramids.

8. The improved secondary containment structure according to claim 1, in which said mass of fibers are selected from the group of materials consisting of carbon and boron.

9. The improved secondary containment structure according to claim 1, in which each of said individual fibers is approximately 2.36" long and 0.03" in diameter with a deformed end.

10. The improved secondary containment structure according to claim 1, in which said fiber concrete composite bottom wall and said fiber concrete composite side wall each has a fiber volume density in the range of from about 8% to about 12%.

11. The improved secondary containment structure according to claim 1, in which said fiber concrete composite bottom wall and said fiber concrete composite side wall each contain one or more mats of individual interlocked strands of fibrous material completely infiltrated by and embedded in a cementious matrix mixture of Portland cement, fly ash, water, and a water-reducing superplasticizer and have a fiber volume density in the range of from about 5% to about 20%.

12. The improved secondary containment structure according to claim 11, in which each fiber strand of said fibrous material mat is approximately 0.03" in diameter.

13. The improved secondary containment structure according to claim 1, in which said cementious matrix mixture includes fine grain sand.

14. The improved secondary containment structure according to claim 1, in which said cementious matrix mixture includes additives selected from the group consisting of microsilica, latex modifiers, and polymers.

15. The improved secondary containment structure according to claim 1, in which said cementious matrix mixture includes fine grain sand and additives selected from the group consisting of microsilica, latex modifiers, and polymers.

16. The improved secondary containment structure according to claim 1, in which said cementious matrix mixture comprises a mixture by weight of;

| | |
|---|---|
| Portland cement | from about 30% to about 90%, |
| fly ash | from about 10% to about 20%, |
| fine grain sand | from 0 to about 50%, |

water in a ratio of water to the sum of cement and fly ash of from about 0.20 to about 0.45, and a water-reducing superplasticizer in a ratio of superplasticizer to the sum of cement and fly ash of from 0 to about 40 ounces per 100 pounds of the sum of cement and fly ash.

17. The improved secondary containment structure according to claim 16, in which said cementous matrix mixture further includes additives selected from the group consisting of microsilica, latex modifiers, and polymers.

18. A method for forming slurry infiltrated fiber concrete products comprising the steps of;

(a) providing a form having a bottom and core component with a side wall form component having opposed lateral side walls joined together to form a hollow box construction open at the top and bottom ends, (b) placing said bottom and core component on a generally flat surface with the core member up, (c) placing said side wall component on said bottom and core component to enclose its open bottom end and surrounding said core member to form a cavity surrounding said core member, (d) placing a plurality of fibers selected from organic or inorganic materials into said cavity to form a bed of fibers substantially filling said cavity with spaces between said fibers, (d) adding a slurry mixture of a concrete composition into the form components to completely infiltrate the spaces between said fibers and fill the cavity surrounding said core member and above said core member, (e) vibrating the mold components as required sufficient to insure complete infiltration of the slurry into the fiber bed, eliminate voids, and compact the concrete therein, (f) allowing the uncured concrete product to completely cure and thereafter removing said side wall component from said bottom and core component, and (g) lifting the cured concrete product from said bottom and core component.

19. The method according to claim 18 including the further step of;

applying a coating of penetrating concrete sealer material the surfaces of the concrete product.

20. The method according to claim 18 in which said step of placing a plurality of fibers in said cavity comprises placing a plurality of individual short fibers into said cavity to form a bed of fibers having a fiber volume density in the range of from about 5% to about 20%.

21. The method according to claim 18 in which said step of placing a plurality of fibers in said cavity comprises placing a plurality of individual short fibers into said cavity to form a bed of fibers having a fiber volume density in the range of from about 8% to about 12%.

22. The method according to claim 18 in which said step of placing a plurality of fibers in said cavity comprises placing one or more mats of fibrous material into said cavity to form a bed of fibers having a fiber volume density range of from about 5% to about 20%.

23. The method according to claim 18 in which said step of adding a slurry mixture of a concrete composition into the form components comprises pumping said slurry mixture under pressure into said cavity to completely infiltrate the spaces between said fibers from the bottom of the bed of fibers to the top thereof and fill the cavity surrounding said core member and above said core member.

24. A method of forming a fiber concrete composite secondary containment structure comprising the steps of;

(a) providing a form having a bottom and core component with a side wall form component having opposed lateral side walls joined together to form a hollow box construction open at the top and bottom ends, (b) placing said bottom and core component on a generally flat surface with the core member up, (c) placing said side wall component on said bottom and core component to enclose its open bottom end and surrounding said core member to form a cavity surrounding said core member, (d) placing a mass of fibers selected from the group of materials consisting of steel, plastic, aramids, carbon and boron into said cavity to form a bed of fibers interlocked with one another substantially filling said cavity and having a fiber volume density in the range of from about 5% to about 20% with spaces between said fibers, (e) after forming the bed of fibers, adding a concrete composition slurry mixture comprising Portland cement, fly ash, water, and a water-reducing plasticizer into the form components to completely infiltrate the spaces between said fibers and fill the cavity surrounding said core member and above said core member, (f) vibrating the mold components as required sufficient to insure complete infiltration of the slurry into the fiber bed, eliminate voids, and compact the concrete therein, (g) allowing the uncured secondary containment structure to completely cure and thereafter removing said side wall component from said bottom and core component, and thereafter (h) removing the cured secondary containment structure from said bottom and core component.

25. The method according to claim 24 in which said step of placing a plurality of fibers in said cavity comprises placing one or more mats of fibrous material into said cavity to form a bed of fibers having a fiber volume density in the range of from about 5% to about 20%.

26. The method according to claim 24 in which said step of adding a slurry mixture of a concrete composition into the form components comprises pumping said slurry mixture under pressure into said cavity to completely infiltrate the spaces between said fibers from the bottom of the bed of fibers to the top thereof and fill the cavity surrounding said core member and above said core member.

* * * * *